Jan. 13, 1953    E. B. CLARK ET AL    2,625,288
ELECTRICAL OUTLET BOX
Filed Oct. 1, 1948    2 SHEETS—SHEET 2

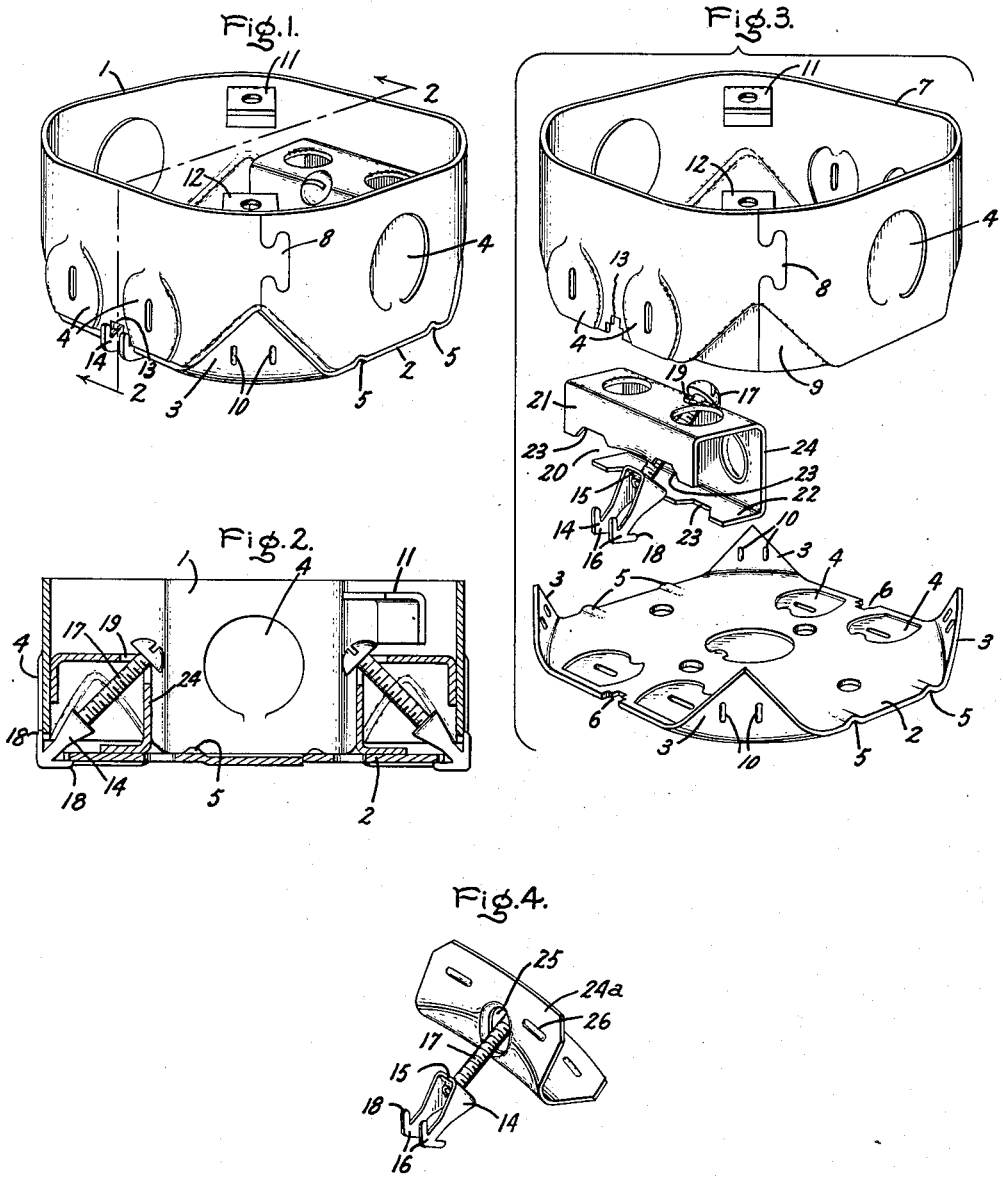

Inventors:
Edward B. Clark,
Frederick W. Fagal,
by
Their Attorney.

Patented Jan. 13, 1953

2,625,288

UNITED STATES PATENT OFFICE 2,625,288

ELECTRICAL OUTLET BOX

Edward B. Clark, Milford, and Frederick W. Fagal, Stratford, Conn., assignors to General Electric Company, a corporation of New York Application October 1, 1948, Serial No. 52,182

1 Claim. (Cl. 220—4)

This invention relates to electrical outlet or junction boxes.

The objects of this invention are to provide a box of this character which is simple and substantial in construction; which may be manufactured at a reduction in costs over present designs.

Figure 5:
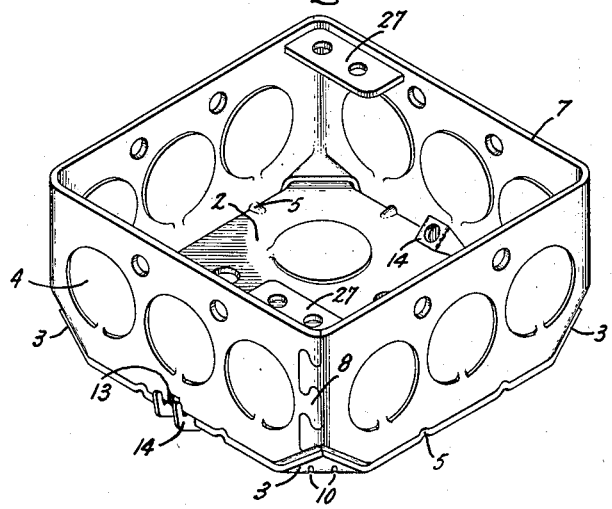
Figure 6:
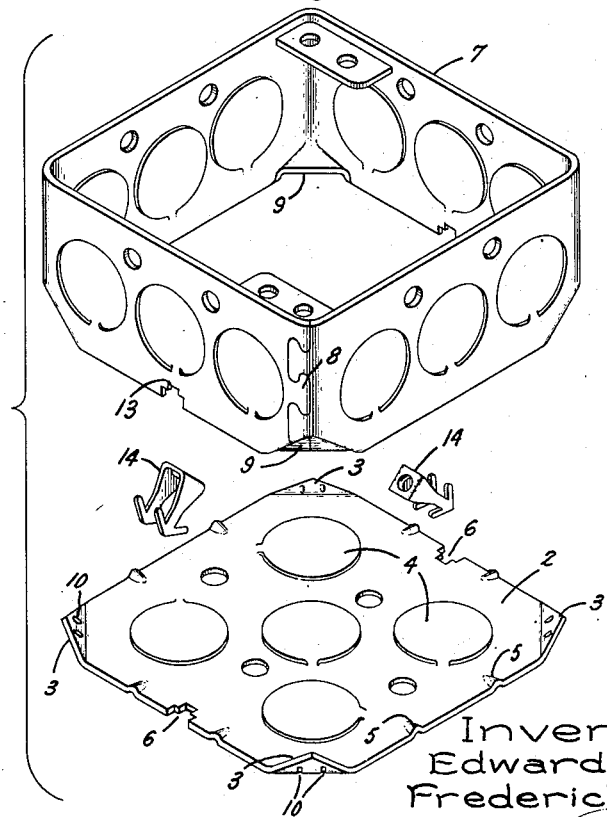

The foregoing, and further objects will appear hereinafter, are attained by the construction to be described and which is illustrated in the accompanying drawings, wherein Fig. 1 is a perspective view showing an octagonal box in assembled form; Fig. 2 is a cross-section taken on line 2—2 of Fig. 1; Fig. 3 is a partially disassembled perspective view showing a metal ring, one armored cable clamp assembly, and a base; Fig. 4 is a perspective view of a non-metallic cable clamp assembly; Fig. 5 is a perspective view in assembled form showing a modification comprising a square box; and Fig. 6 is a partially disassembled perspective view of Fig. 5.

In general, our invention lies in a box made by turning up the corners of a polygonal flat metal base to lie in corresponding preformed depressions in a metal ring forming the sides of the box.

One form of a junction and outlet box in accordance with our invention is shown in Figs. 1 to 3. A completely assembled box is shown in Fig. 1 and numbered 1. The box comprises side walls formed of one piece of metal and a base formed of another piece of metal.

To manufacture this box we form the base 2 from a piece of polysided flat sheet metal and turn up the corners 3, in this approximately 90°. The flat surface of this base 2 is provided with the usual knockouts or pryouts 4. The edges of the base 2 are provided with projections 5 whose function will be explained later. We have also provided two T-shaped recesses 6 in two opposite edges of the base to accommodate anchor-shaped studs which will be described later.

The side walls of the box are formed from a flat strip of sheet metal bent into a ring 7. This ring is bent to conform to the shape of the polygonal base 2. The ends of the ring are joined by a dovetail joint 8 or other suitable means, and the sides are provided with the usual knockouts or pryouts 4 for incoming cables. The surface of the metal ring (preferably the outer surface), is also provided with preformed depressions 9 located opposite the corners 3 of the base 2 and shaped so that when the ring is fitted to the base, the corners 3 will fit into the depressions 9 where they may be welded to the ring. Our completed box thereby presents a relatively smooth outer surface.

As shown in Figs. 1 and 3, projections 10 are formed in each of the corners 3 so that welding may be done by the projection method. It will be further noted that the joined edges of the ring below the dovetail joint 8 are positioned between the two projections 10 of one of the corners 3. This is done in order that the welds may be made on opposite sides of the joint to aid in holding the ring together. Two ears 11 and 12 are welded to the ring 7 as a means for securing a cover to the outlet box. The ear 12 is so positioned on the ring as to coincide with the joined edges of the ring above the dovetail joint 8 and thus further aid in holding the ring together. For still further adding to the rigidity of the box, the projections 5 are welded into the lower edge of ring 7.

An improved cable clamping means for securing cable to the box is illustrated. As shown in Fig. 3, two studs 14 are made from a flat strip of metal having double anchor-shaped ends 16 which are bent at right angles to a base portion 15 of the strip to form a U-shaped element. The base portion 15 is pierced, swedged and threaded to receive a screw 17. The anchor-shaped legs 16 have anchor tips 18.

As shown in Fig. 3, T-shaped recesses or slots 13, are provided in the lower edge of the ring 7 and positioned to coincide with the recesses 6 in the base 2. Before the ring 7 is assembled on and welded to the base 2, the double anchor-shaped studs 14 are fitted into the T-shaped recesses 6 and 13. After the ring is welded to the base, the tips 18 of the anchor legs 16 will rest against the outer surfaces of the ring 7 and the base 2 adjacent to the T-shaped recesses 6 and 13 as shown in Fig. 2. A metallic armored cable clamp 24 is then placed in the box in a position adjacent the stud 14 so that the anchor stud 14 may receive the screw 17 passing through an appropriate opening 19 in the clamp 24 and the space 20 between the two sides 21 and 22 of the clamp 24. Sides 21 and 22 have four edge recesses 23 which serve as jaws to clamp the cables against the inside of the ring and base of the outlet box as screw 17 is tightened. When screw 17 is tightened, the anchor tips 18 will slide on the outer surface of the ring and base and align the anchor stud 14 with the screw 17. Thus, the anchor stud 14 is self-adjusting for deviations in the position of the cable clamp when the cable clamp is drawn down upon the entering cable, and there is no binding of the screw 17.

Fig. 4 shows an alternative form of clamp 24a for use with non-metallic cable. Its form is approximately a V-shape with an opening 25 for the screw 17 and projections 26 to grip the cable and secure the same against the ring and base of the outlet box as the screw 17 is tightened.

It is also conceivable that pieces 14, 17 and 24 or 24a could be made up as sub-assemblies and assembled to the base and ring as integral units instead of separate pieces.

The above is a description of one form of outlet box in accordance with our invention. It is to be understood that the shape of the box may be varied by changing the length or the number of sides of the base with appropriate changes in the ring without departing from the spirit and scope of this invention. As an illustration, Figs. 5 and 6 show a square box. In this modification the corners 3 of the base 2 are turned up less than 90° and the box ring is deformed accordingly in depressions 9 adapted to mate with the corners. Here again, the ends of the ring are joined by a dovetail joint 8 preferably so located that the joined edges of the ring 7 will be centered between the two projection welds 10. In this box the shape of the mounting ears 27 have been changed to be better adapted to the more rectangular corners of this box. Projections 5 are used in the base to projection weld the base to the ring and to prevent warping. If desired, T-shaped recesses 6 and 13 may, of course, be provided in the base to accommodate anchor studs 14 between the ring and the base; and the positions of the knockouts may be arranged as desired.

The combination of the cable clamp and outlet box, herein disclosed but not claimed, is further disclosed and claimed in a copending application, Serial No. 178,058, filed August 7, 1950, which is assigned to the same assignee as the present application.

What we claim as new and desire to secure by Letters Patent of the United States is:

An outlet box comprising a plurality of straight-edged flat sides joined together by rounded corners, the rounded corners adjacent the bottom of the box being indented to provide triangular-shaped inwardly extending depressions which taper upwardly and outwardly from the bottom edges of the corners, and a base member comprising a straight-sided plate having a contour corresponding to that formed by the side walls, the corners of the plate being bent up at an angle to provide triangular-shaped ears positioned in said triangular-shaped depressions, and means fastening the ears in the depressions, whereby said box sides and base may be formed from straight-sided strip material without waste.

EDWARD B. CLARK.
FREDERICK W. FAGAL.

REFERENCES CITED

The following references are of record in the file of this patent:

UNITED STATES PATENTS

| Number | Name | Date |
|---|---|---|
| 782,417 | Robb | Feb. 14, 1905 |
| 1,072,009 | Keefe | Sept. 2, 1913 |
| 1,161,396 | Long | Nov. 23, 1915 |
| 1,235,115 | Coppage | July 31, 1917 |
| 1,557,066 | Krantz | Oct. 13, 1925 |
| 1,655,793 | McCrery | Jan. 10, 1928 |
| 1,817,307 | Haase et al. | Aug. 4, 1931 |
| 1,872,394 | Bleicher | Aug. 16, 1932 |
| 1,909,136 | Thomas, Jr. | May 16, 1933 |
| 1,922,432 | Gould | Aug. 15, 1933 |
| 1,929,218 | Sambleson | Oct. 3, 1933 |
| 1,977,567 | Eksergian | Oct. 16, 1934 |
| 2,051,129 | Clayton | Aug. 18, 1936 |
| 2,059,671 | Steenweg | Nov. 3, 1936 |
| 2,062,910 | Keulers | Dec. 1, 1936 |
| 2,158,972 | Weindel | May 16, 1939 |
| 2,222,389 | Zimmer | Nov. 19, 1940 |
| 2,269,113 | Kasch | Jan. 6, 1942 |
| 2,437,073 | Carlson | Mar. 2, 1948 |
| 2,445,548 | Wiepert | July 20, 1948 |
| 2,544,232 | Kennedy | Mar. 6, 1951 |